United States Patent
Dahlheimer

(10) Patent No.: US 8,851,410 B2
(45) Date of Patent: Oct. 7, 2014

(54) CUTTING DEVICE FOR A GRANULATOR FOR OBTAINING GRANULES BY CUTTING

(75) Inventor: Stefan Dahlheimer, Kleinostheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 176 days.

(21) Appl. No.: 13/582,711

(22) PCT Filed: Mar. 7, 2011

(86) PCT No.: PCT/EP2011/053369
§ 371 (c)(1),
(2), (4) Date: Oct. 11, 2012

(87) PCT Pub. No.: WO2011/107609
PCT Pub. Date: Sep. 9, 2011

(65) Prior Publication Data
US 2013/0037641 A1   Feb. 14, 2013

(30) Foreign Application Priority Data
Mar. 5, 2010   (DE) .......................... 10 2010 010 368

(51) Int. Cl.
*B02C 18/16*   (2006.01)
*B29B 9/06*   (2006.01)

(52) U.S. Cl.
CPC .. *B29B 9/065* (2013.01); *B29B 9/06* (2013.01)
USPC .......................................... 241/277; 425/311

(58) Field of Classification Search
USPC ............. 241/277, 282.1, 282.2; 425/311, 313
See application file for complete search history.

(56) References Cited

U.S. PATENT DOCUMENTS

| | | | |
|---|---|---|---|
| 4,260,356 A | 4/1981 | Fujiwara et al. | |
| 2003/0213352 A1 | 11/2003 | Konno et al. | |

FOREIGN PATENT DOCUMENTS

| | | |
|---|---|---|
| DE | 2638126 A1 | 3/1978 |
| DE | 10056991 C1 | 11/2000 |
| DE | 10321723 A1 | 5/2004 |
| EP | 0160319 A2 | 11/1985 |
| EP | 2075103 A1 | 7/2009 |
| JP | 58191427 | 12/1983 |
| JP | 60234125 | 11/1985 |
| JP | 2003326519 A | 11/2003 |

OTHER PUBLICATIONS

Office Action issued on Jan. 10, 2014 in JP Application No. 2012-555447.
Intl. Search Report of PCT/EP2011/053369 filed Mar. 7, 2011 (5 pages).
German Search Report of German Appl. No. 102010010368.3 filed Mar. 5, 2010 (4 pages).

*Primary Examiner* — Mark Rosenbaum
(74) *Attorney, Agent, or Firm* — Pillsbury Winthrop Shaw Pittman LLP

(57) ABSTRACT

The invention relates to a cutting device for a granulator for obtaining granules from cutting plastic strands which are discharged from nozzles, said cutting device comprising a cutting rotor which is connected to the drive shaft by means of a Cardan joint piece comprising a driven part and a drive part. Said drive part and the driven part comprise a force transfer piece, respectively having a prong like shape such that the prongs rotate about the force transfer piece when they are pivoted at about 90 degrees in relation to each other. Each prong supports the axis which extends through the force transfer piece and both axes are offset in relation to each other essentially about 90 degrees.

10 Claims, 4 Drawing Sheets

CUTTING DEVICE FOR A GRANULATOR FOR OBTAINING GRANULES BY CUTTING

CROSS-REFERENCE TO RELATED APPLICATIONS

Figure 1:
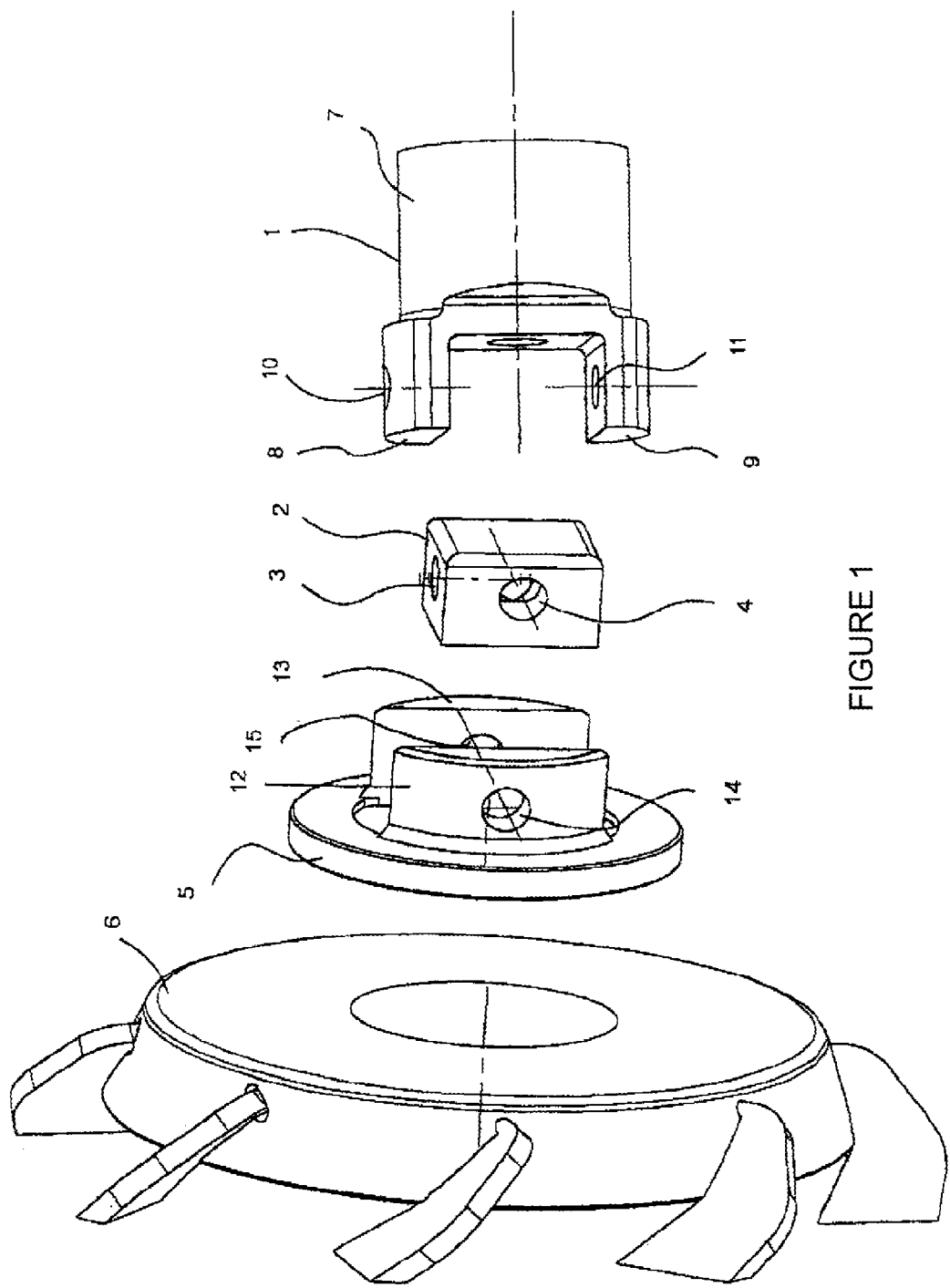

This application is a U.S. National Stage application under 35 USC §371 of PCT/EP2011/053369 filed 7 Mar. 2011, which claims priority under the Paris Convention to German Application No. 102010010368.3 filed 5 Mar. 2010, the entire contents of each of these applications being incorporated herein by reference.

The invention relates to a cutting device for a granulator for obtaining granules from cutting plastic strands which are discharged from nozzles, said cutting device comprising a cutting rotor which is connected to a drive shaft by means of a cardanic joint piece comprising a driven part and a drive part.

A cutting device of this type has already been described in DE 103 21 723 A1. The cutting device illustrated in FIG. 5 of this printed document requires three individual parts that have been assembled to drive a cutting rotor by means of a drive part via a cardanic joint piece. In this case, the force is transmitted via said joint piece, in which a drive part actuates a frame which has two axles, via an axle that extends perpendicular to the drive direction. Said frame takes up said drive force via a first axle thereof and transmits it to a driven part via a second axle that extends perpendicular to said first axle. Said driven part constitutes the blade carrier for a cutting device. This device has a relatively complex structure in which any axle direction changes from a drive shaft to the cutting rotor occurring during the operation of the cutting device are compensated by the joint piece. As a result, the overall structure is relatively complex and its assembly is considerably aggravated by the fact that the individual parts are nested in each other.

It is the object of the present invention to provide a cutting device which can also use a cardanic joint piece that is characterized by a particularly simple structure. In the present invention, this is accomplished in that both the drive part and the driven part comprise a force-transmitting part each including a fork-like element wherein said fork-like elements, offset at 90° relative to each other, will enclose said force-transmitting part, with each fork-like element supporting an axle that extends through said force-transmitting part and said two axles being offset at an angle of 90° relative to each other.

When using two fork-like elements that can be made to engage each other, the interior space defined between the two fork-like elements in the engaged position can then be filled with a simple structural element, i.e. a cube, through which two axles extend that are offset at an angle of 90° with respect to each other. This design can easily be assembled by making these elements engage each other, with the prongs of said fork-like elements engaging each other in such a manner that the free space remaining between the prongs can accommodate a force-transmitting part of a simple design. As a result, once the two axles have been inserted, the overall structure is practically finished.

It is considered advantageous to design the force-transmitting part in the shape of a cube. During assembly, each fork will then grip the cube at two opposite sides thereof, resulting in an element of harmonious external design and appearance, into which the two axles can be readily introduced after assembly.

In this case, it is considered particularly advantageous to design the one fork-like element in such a way that it is a component part of the cutting rotor, which makes its design particularly short. A drive shaft will then merely have to be connected to the opposing fork-like element. As a result, all the required parts for the cutting device will then be connected via the cardanic joint piece.

Advantageously, the two axles traversing said cube should be made to extend in the same plane.

The force-transmitting part with its two fork-like elements can advantageously be housed within the cutting rotor, with the side of the cutting rotor facing the nozzles being of a closed design. This results in a particularly compact design in which, owing to the force-transmitting part with its two forks being incorporated within the cutting rotor, the cutting device can be made short in its axial length.

The drawings are illustrations of embodiments of the invention, of which

Figure 2:
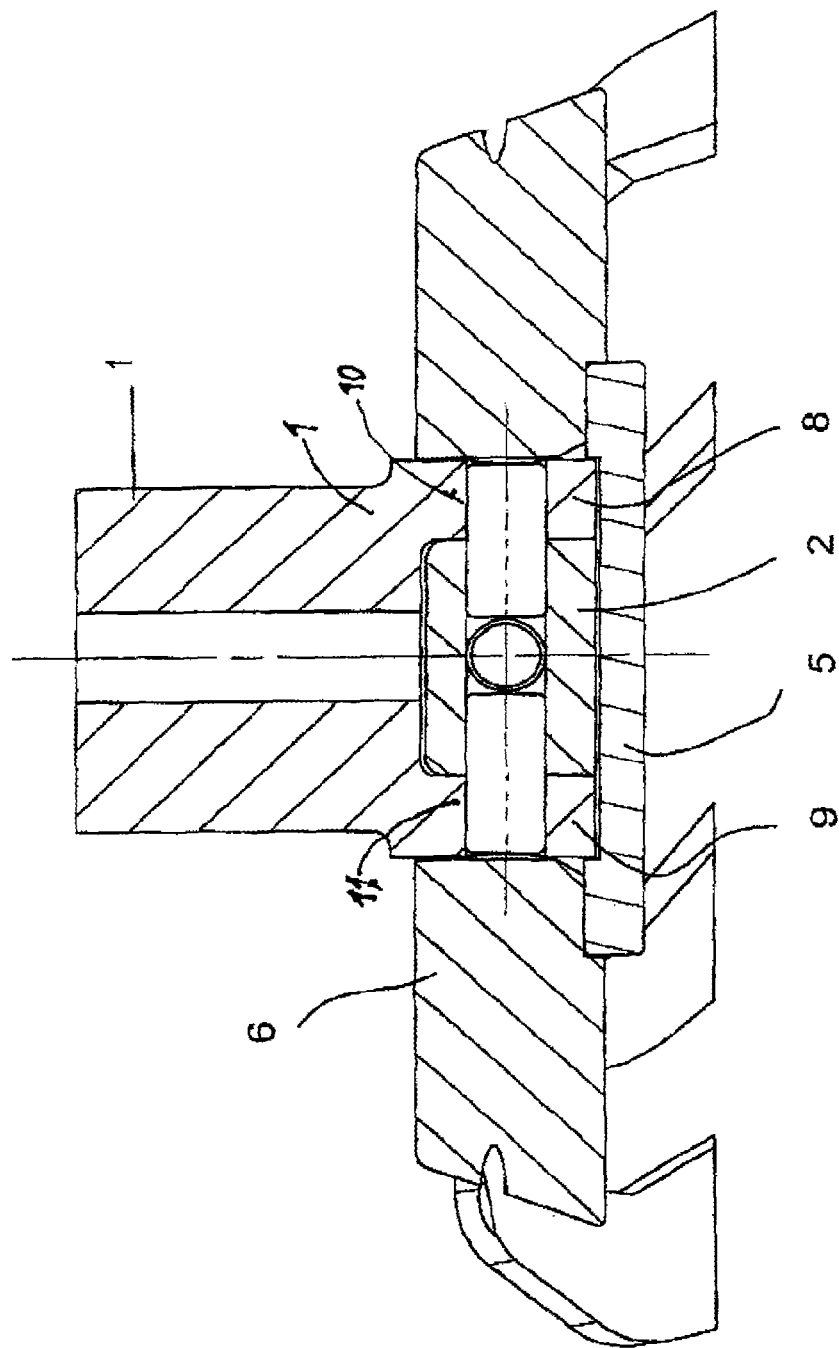
Figure 3:
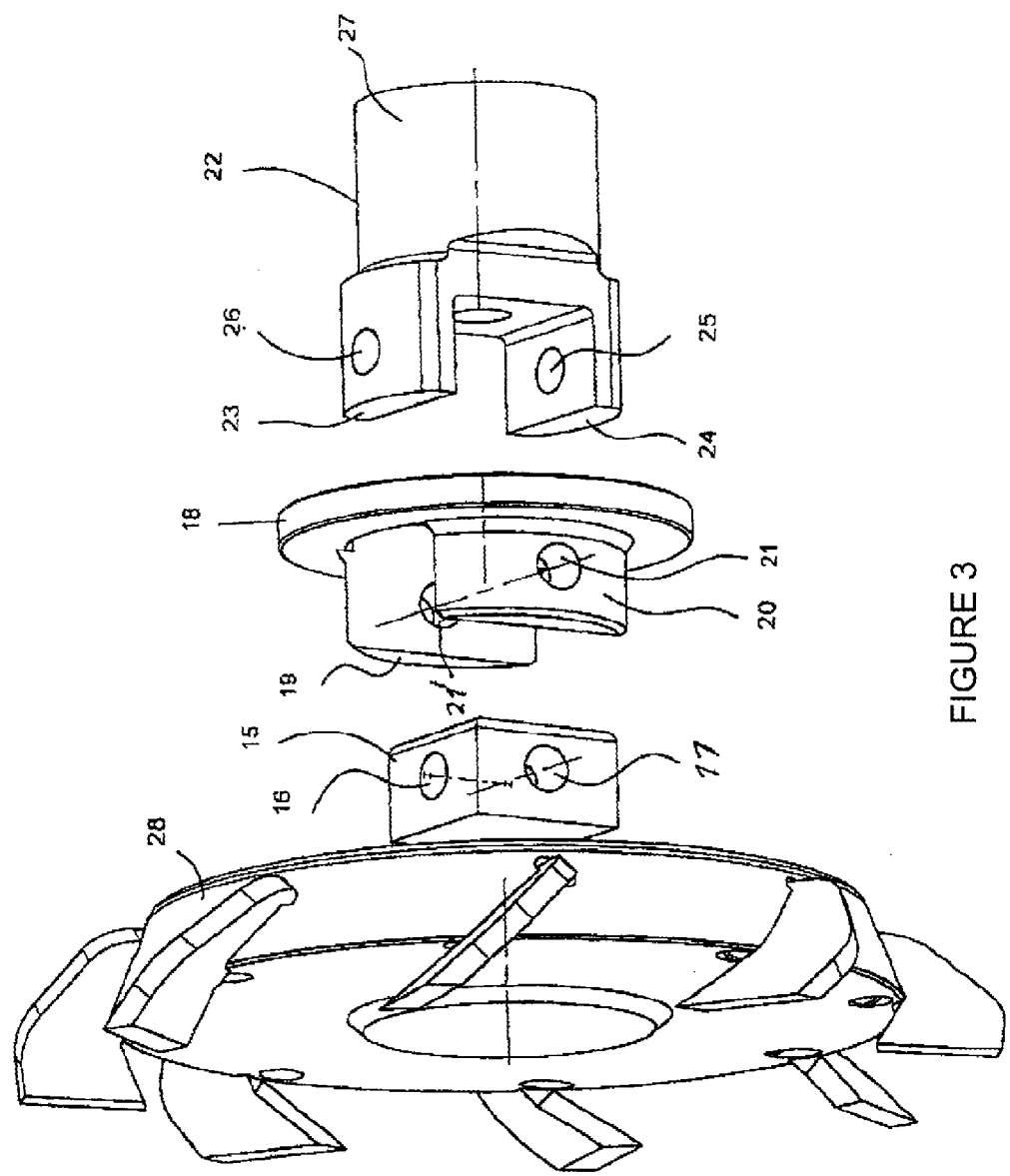
Figure 4:
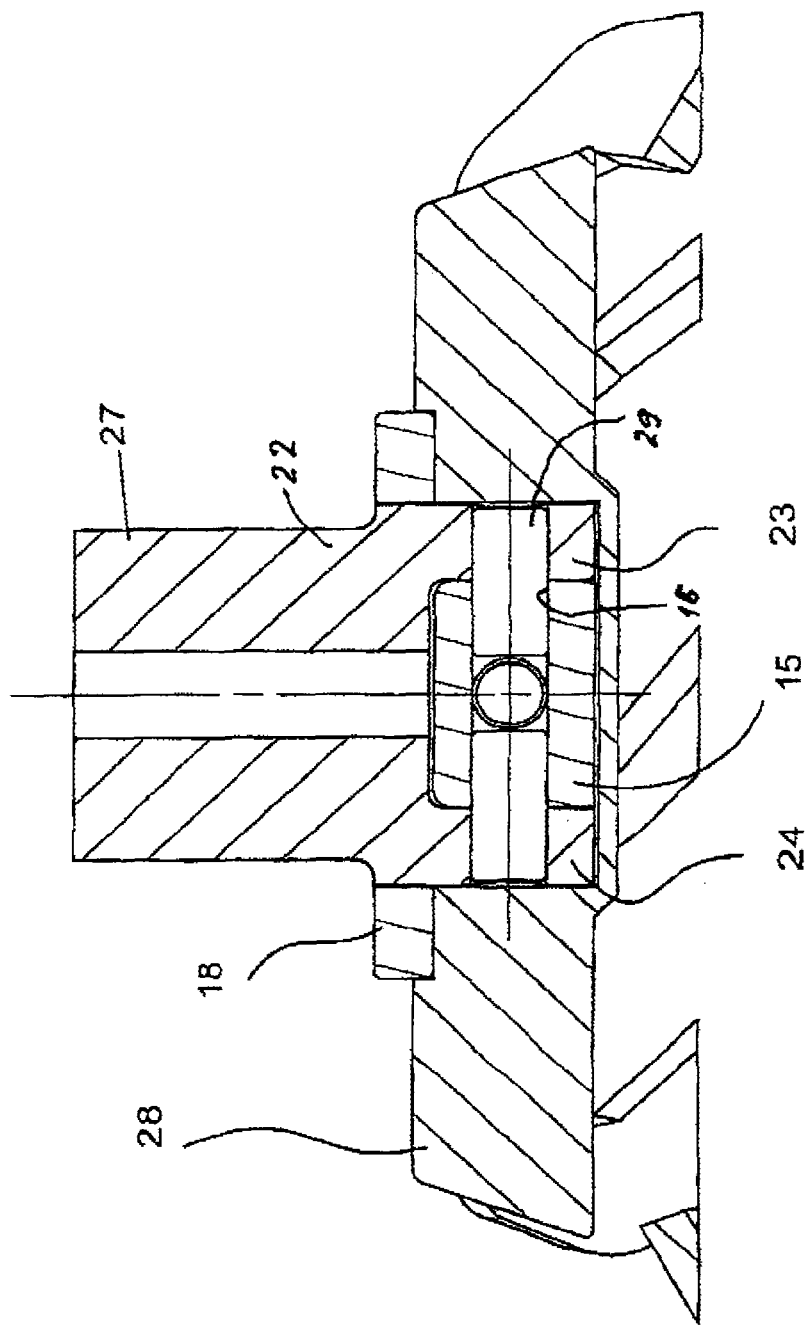

FIG. 1 is a view of the components of the cutting device including the cube and the fork-like elements on either side thereof in a position immediately prior to assembly;

FIG. 2 a view of the components of FIG. 1 after assembly to form a module serving as a cutting device for a granulator;

FIG. 3 a view of the components of a cutting device in which the one of the two fork-like element has been inserted into the other;

FIG. 4 a view of the components shown in FIG. 3 after assembly to form a module.

FIG. 1 shows the components of the cutting device according to a first embodiment of the invention. In detail, these are a first fork-like element 1 to which any drive shaft can be connected, a cube 2 which functions as the force-transmitting part and includes two axle bores 3 and 4, a second fork-like element 5 and a cutting rotor 6 having cutting edges 29 and being connected to said fork-like element 5 in any known manner.

The fork-like element 1 includes the axle socket 7 which is to be connected in any known manner to a drive shaft. Protruding from said fork-like element 1 are two prongs 8 and 9 which are suitably spaced from each other to allow the cube 2 to be fitted between these two prongs 8 and 9. In this assembly, the cube 2 will be slidingly inserted between the two prongs 8 and 9 to such an extent that its axle bore 3 will ultimately be aligned with axle bores 10 and 11 provided in the prongs 8 and 9. This will allow suitable axles to be slidingly inserted into said bores 3, 10 and 11 at a later stage once all the components have been assembled.

FIG. 1 furthermore shows the second fork-like element 5 having two prongs 12 and 13 of a similar design as prongs 8 and 9. These prongs 12 and 13 are spaced from each other at a suitable distance that will allow the cube 2 to be slidingly inserted and fitted between the two prongs 12 and 13 until bore 4 of cube 2 is aligned with axle bores 14 and 15 provided in the two prongs 12 and 13 so that an axle can also be introduced here later on. Thus the respective part of a cutting device has its final shape as shown in FIG. 2.

FIG. 2 shows the components of FIG. 1 after assembly. Shown therein is the fork-like element 1 with its two prongs 8 and 9 holding the cube 2 between them. In this case, the fork-like element 1 can be rotated about an axle indicated as a dashed line which has been slidingly inserted into axle bores 10 and 11.

FIG. 2 furthermore shows the cutting rotor 6 which is firmly connected to the fork-like element 5. When a driving force acts on the fork-like element 1, this force will also be transmitted to said cube 2 and said fork-like element 5 and thus ultimately cause the cutting rotor 6 to be driven. In this case, the cutting rotor 6 may be slightly offset angularly from the fork-like element 1, as a result of the cardanic joint connection.

FIGS. 3 and 4 show a modified design compared to the embodiment of FIGS. 1 and 2. In this embodiment, prongs 19 and 20 engaging the force-transmitting part 15 are slid over the force-transmitting part 15 from the same side as prongs 23 and 24. The force-transmitting part 15 is essentially designed in the same way as the force-transmitting part 2 of FIG. 1. It has two intersecting bores 16 and 17 which serve to accommodate axles for rotating the one fork-like element 18 on the one hand and the other fork-like element 22, on the other. The two prongs 19 and 20 of the fork-like element 18 are slid over the force-transmitting part 15, with the axles bores 21 and 21' being aligned with each other. As can be seen from FIG. 4, another fork-like element 22 has been slidingly inserted into the first fork-like element 18, with its prongs 23 and 24 suitably enclosing the force-transmitting part 15 and with bore 16 being aligned with bores 25, 26. Defined between the prongs 19, 20 of the first fork-like element 18 is a sufficiently large free space to allow a respective rotary motion of the prongs 23 and 24 of the second fork-like element 22. Consequently, the fork-like elements 18 and 22 can be rotated with respect to the force-transmitting part 15, at the same time ensuring the cardanic movability of these parts with respect to each other. The fork-like element 22 then merges into drive part 27 which can then be connected to some appropriate drive unit. The fork-like element 18 is inserted in an appropriately shaped holding fixture provided on said cutting rotor 28 so that if the fork-like element 18 can be moved appropriately, its rotation will be transmitted to the cutting rotor 28.

FIG. 4 shows the parts illustrated in the exploded view of FIG. 3 in an assembled state. As may be seen here, the assembly of FIG. 4 creates a cardanic connection between the drive part 27 and the cutting rotor 28. Accommodated within said cutting rotor 28 is the force-transmitting part 15 of which bore 16 is shown through which an axle 29 has been slidingly inserted and anchored in the prongs 23, 24.

It should be noted that due to the fact that bores 3 and 4 as well as 16 and 17 intersect, only one continuous axle passes through these bores which axle is then anchored either in the cutting rotor or in the drive part, while the other intersecting axle that has been introduced into the respective bores that extend perpendicular thereto consists of two stub shafts which are inserted in the respective external part, i.e. either drive part or cutting rotor, and from there protrude into the respective drive part from the respective prongs.

What is claimed is:

1. A cutting device for a granulator for obtaining granules from cutting plastic strands, said cutting device comprising a cutting rotor which is connected to a drive shaft by means of a cardanic joint piece comprising a driven part and a drive part in which the drive part as well as the driven part comprise a force-transmitting part each with a prong-like element comprising prongs such that a pair of prongs positioned at an angle of about 90° relative to the prongs enclose the force-transmitting part with each of the prongs of the pair of prongs supporting an axle that extends through said force-transmitting part and both axles being essentially offset at about 90° from each other, wherein the force-transmitting part is incorporated within said cutting rotor in such a way that one said prong-like element is a component part of the cutting rotor and other said prong-like element comprises a axial connection to extend into a drive access.

2. The cutting device of claim 1, wherein said force-transmitting part is provided in the form of a cube.

3. The cutting device according to claim 2, wherein the side of the cutting rotor facing the nozzles being a closed design.

4. The cutting device of claim 2, wherein two opposite sides of said cube are each enclosed by the two prongs of a fork-like element.

5. The cutting device of claim 4, wherein the two axles extend in the same plane.

6. The cutting device according to claim 4, wherein the side of the cutting rotor facing the nozzles being a closed design.

7. The cutting device of claim 2, wherein the two axles extend in the same plane.

8. The cutting device of claim 1, wherein the two axles extend in the same plane.

9. The cutting device according to claim 8, wherein the side of the cutting rotor facing the nozzles being a closed design.

10. The cutting device according to claim 1, wherein the side of the cutting rotor facing the nozzles being a closed design.

* * * * *